No. 767,553. PATENTED AUG. 16, 1904.
P. EDGELOW.
DENTAL TROUGH.
APPLICATION FILED DEC. 7, 1903.
NO MODEL.
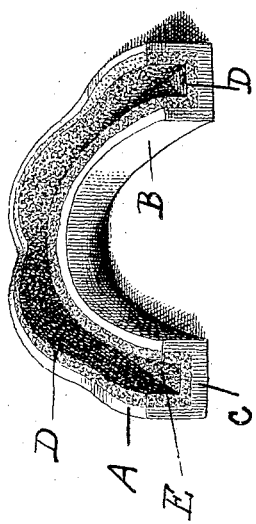

No. 767,553.

Patented August 16, 1904.

UNITED STATES PATENT OFFICE.

PERCY EDGELOW, OF LONDON, ENGLAND.

DENTAL TROUGH.

SPECIFICATION forming part of Letters Patent No. 767,553, dated August 16, 1904.

Application filed December 7, 1903. Serial No. 184,164. (No model.)

*To all whom it may concern:*

Be it known that I, PERCY EDGELOW, a subject of the King of England, residing at London, England, have invented a new and useful Improvement in Dental Appliances, of which the following is a clear and exact specification.

My invention relates to a medical apparatus more particularly designed for use in connection with dental treatment; and it consists of a guttered or channel-shaped appliance or trough adapted to envelop the teeth and gums of beings in such a manner as to keep in contact with the teeth and gums any medical application, particularly solutions, which it may be found necessary to use.

The appliance is illustrated in the annexed drawing and forms a container, consisting of an outer wall A and an inner wall B, which walls are joined by a base C in such a manner as to present a gutter E, adapted to receive an absorbent lining or pad D. The external wall A is adapted to encircle the outer surfaces of the teeth and gums of the jaw. The base C rests against the cutting and masticating surfaces of the teeth, respectively, and the inner wall B is adapted to encircle the inner surfaces of the teeth and gums. The walls are so shaped as to practically conform to the general outline and configuration of the marginal lines of the jaws with the gums and teeth. For this purpose the base C is made narrow at front opposite the cutting edges of the six front teeth, then becomes broader around the side portion for the broader surfaces of the side teeth, and broadest behind or the rear end to correspond to and receive the broad masticating-surfaces of the back teeth. Moreover, the inner wall should be formed to avoid the palate or roof of the mouth. The walls and base are molded of soft rubber, and the interior is provided with a thin layer or lining D, of spongy absorbent rubber, which can be readily secured in its place between the said walls and base by an application of liquid rubber subsequently to the formation of such walls and base in a mold. The absorbent lining D is charged with the medicament which it is desired to retain in contact with the gums and teeth. Thus when the appliance is placed in position in the mouth of the patient the teeth and gums rest in the gutter or channel E, and so are brought into direct contact with the absorbent lining D, charged with the medicament, thereby permitting the latter to take effect and be kept there for an appreciable length of time, as may be desired.

What I claim as my invention, and desire to secure by Letters Patent of the United States, is—

In a dental appliance for applying medicaments to the gums and teeth, the combination of an outer wall and an inner wall and a mutual base all of soft rubber, with a spongy rubber lining secured thereto.

In testimony whereof I have affixed hereunto my hand in presence of two subscribing witnesses.

Dated London, this 20th day of May, 1903.

PERCY EDGELOW.

Witnesses:
 ALMA GOEHT,
 EFFIE EDGELOW.